Sept. 27, 1927.
S. W. SLEITH
GOLF CLUB
Filed April 21, 1926
1,643,754
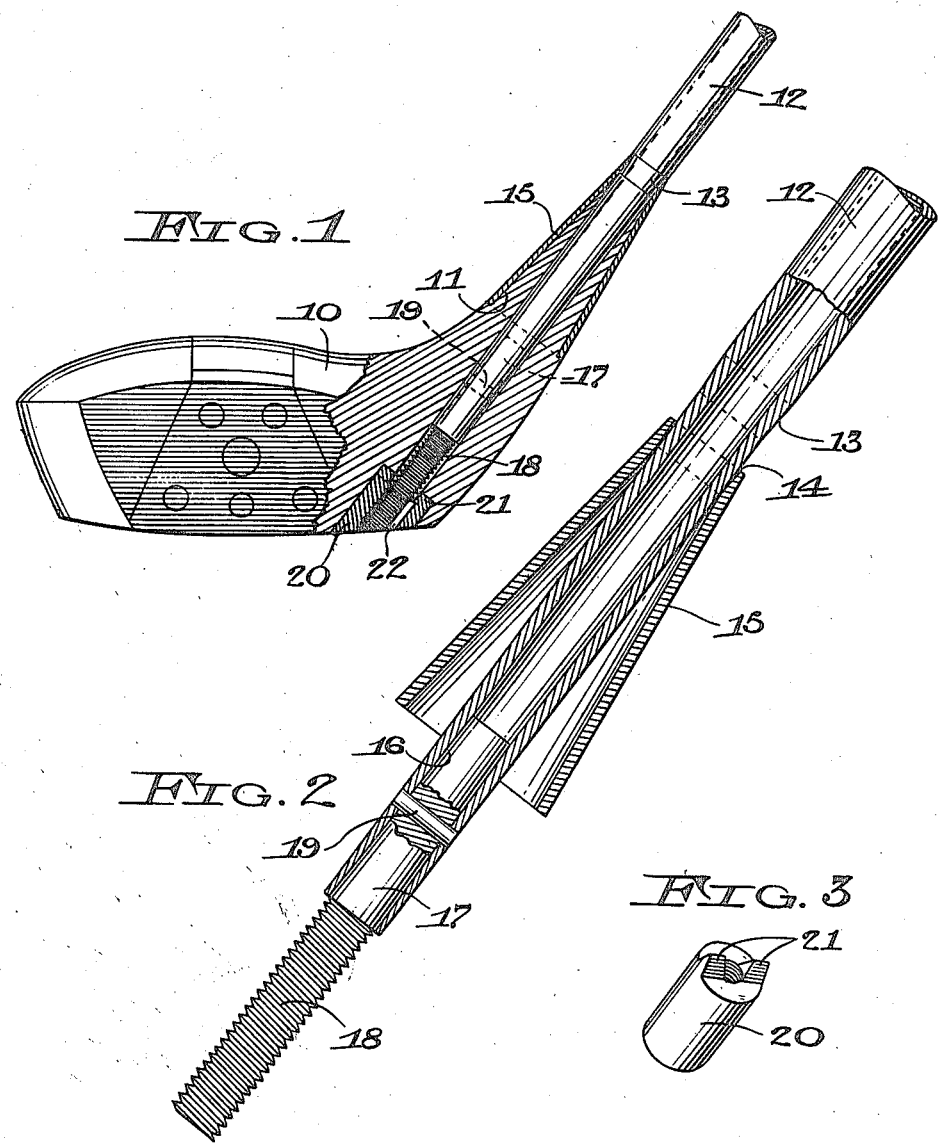
WITNESSES
INVENTOR
ATTORNEY Patented Sept. 27, 1927.

1,643,754

UNITED STATES PATENT OFFICE.

SAMUEL W. SLEITH, OF LOUISVILLE, KENTUCKY, ASSIGNOR, BY DIRECT AND MESNE ASSIGNMENTS, TO GREAT LAKES GOLF CORPORATION, OF MILWAUKEE, WISCONSIN, A CORPORATION OF WISCONSIN.

GOLF CLUB.

Application filed April 21, 1926. Serial No. 103,523.

This invention has for its object to provide a golf club with a strong and permanent connection between the metal shaft and the head of the club that will not permit turning and that will remain tight indefinitely.

With the above and other objects in view the invention consists in the golf club as herein claimed and all equivalents.

This application constitutes a continuation in part and a substitute application for my application for golf clubs, Serial No. 8,446, filed February 11, 1925.

Referring to the accompanying drawings, in which like characters of reference indicate the same parts in different views, Fig. 1 is a sectional view of a golf club having a shaft connection embodying the present invention;

Fig. 2 is an enlarged sectional view of the shaft, the ferrule, and the screw pin, and Fig. 3 is a perspective view of the nut.

In these drawings, 10 indicates the head of a driver which may be, as usual, of wood and is provided with a tapering shouldered neck 11, through the tapered bore of which passes the tapered end of the tubular metal shaft 12 preferably of steel.

This shaft 12 is provided with an external tapered shoulder 13 to engage with a correspondingly tapered opening 14 at the smaller end of the surrounding conical metal ferrule 15 and is also provided with an internal taper 16 to fit the tapering end of a screw pin 17. The screw pin 17 has a screw thread 18 which is preferably a left hand screw thread for a right hand club or a right hand screw thread for a left hand club.

The screw pin 17, when firmly seated in the taper of the shaft 12, is secured in place by a locking pin 19 passed through them, as shown in Fig. 2. At the lower end of the bore through the neck of the head is embedded a nut 20, preferably cylindrical to neatly fit a bored opening, as shown. This nut may be provided with one or more spurs or barbs 21 at its end to bite into the wood and prevent it from turning therein.

In assembling the device the parts as shown in Fig. 2 receive the neck of the club head and the shaft is turned to thread the screw pin through the nut and, as this turning proceeds, the ferrule 15 is drawn by its engagement with the shoulder 13 of the shaft into tight clamping engagement with the tapering end of the neck, compressing the wood bewteen the ferrule and the shaft and clamping it firmly as a wedge between them until the ferrule fits against the shoulder of the neck, as shown in Fig. 1. This clamping action has served to draw the spurs of the nut firmly into locking engagement with the head so that it cannot turn therein and the protruding portions of the nut and the screw stem are ground away flush with the bottom of the head of the club.

If desired, provision may be made for preventing further turning of the shaft by drilling a hole in the interfitting threads of the screw pin and the nut and driving a locking pin 22 in such hole.

By means of this connection the parts are firmly drawn together by the turning of the shaft until all are wedged tightly together and become a solid unit and, when so combined, constitute a strong connection that will not permit the shaft to turn in the head and all parts are permanently locked together.

When the club is used without the locking pin 22 the left hand thread tends to tighten the joint with use and insure against play between the shaft and head at all times.

What I claim as new an desire to secure by Letters Patent is:

1. In a golf club, a shaft, a club head having a neck through which the shaft passes, a conical ferrule on the shaft and fitting on the neck, and a nut embedded in the head and having threaded connection with the shaft.

2. A golf club comprising a shaft having a tapering shoulder, a conical ferrule surrounding the shaft and seated on the shoulder, a club head having a neck fitting within the ferrule and through which the shaft passes, a nut countersunk within the club head and incapable of turning therein, and a threaded stem on the shaft fitting within the nut.

3. In a golf club, a tubular metal shaft having an external shoulder, a conical ferrule surrounding the shaft and seated on the shoulder, a club head having a tapering neck fitting within the ferrule and through which the shaft passes, a screw stem fitting within the end of the shaft, a lock pin for locking them together, and a nut countersunk within the club head and having the screw stem threaded therein.

4. In a golf club, a tubular metal shaft having an external shoulder, a conical ferrule surrounding the shaft and seated on the shoulder, a club head having a tapering neck fitting within the conical ferrule and through which the shaft passes, a screw stem having a tapering fit within the end of the shaft, a locking pin passing through them, a cylindrical nut embedded in the club head and having the screw stem threaded therein, said nut being provided with spurs for preventing it from turning, and a lock pin intersecting the screw threads of the nut and the screw stem.

5. In a golf club, a shaft having a conical flange thereon and facing toward the lower end thereof, a club head having a conically tapered neck and having a bore formed therethrough for the reception of the shaft and means connecting the club head and shaft for shifting the club head upon the shaft to engage the conically tapered neck thereof between the shaft and said conical flange.

6. In a golf club, a tapered shaft having a conical flange thereon and facing toward the lower end thereof, a club head having a conically tapered neck and having a tapered bore formed therethrough for the reception of the shaft and means connecting the club head and shaft for shifting the club head upon the shaft to simultaneously engage the conically tapered neck thereof between the shaft and said conical flange and seat the shaft in the bore.

7. In a golf club, a shaft having a conical flange thereon and facing toward the lower end thereof, a club head having a conically tapered neck and having a bore formed therethrough for the reception of the shaft and means connecting the club head and shaft for shifting the club head upon the shaft to engage the conically tapered neck thereof between the shaft and said conical flange including a part keying the club head to the shaft.

8. In a golf club, a tapered shaft having a conical flange thereon and facing toward the lower end thereof, a club head having a conically tapered neck and having a tapered bore formed therethrough for the reception of the shaft and means connecting the club head and shaft for shifting the club head upon the shaft to simultaneously engage the conically tapered neck thereof between the shaft and said conical flange including a part keying the club head to the shaft.

9. In a golf club, a tapered shaft, a club head having a neck with a tapered bore through which the shaft passes, a ferrule surroundnig the neck, and a nut embedded in the head and having threaded connection with the shaft.

10. In a golf club, a tapered shaft, a club head having a neck with a tapered bore through which the shaft passes, and a nut embedded in the head and having threaded connection with the shaft.

In testimony whereof, I affix my signature.

SAMUEL W. SLEITH.